United States Patent [19] [11] Patent Number: 4,624,324
Mathieu et al. [45] Date of Patent: Nov. 25, 1986

[54] TURNING MECHANISM OPERATING ALTERNATELY IN OPPOSITE DIRECTIONS TO FACILITATE THE DRIVING IN OR EXTRACTING OF PILES

[75] Inventors: Hans Mathieu, Saarbrücken-Bischmisheim; Jürgen Hochstrasser, Kobenhüttenweg 20, D-6600 Saarbrücken 3, both of Fed. Rep. of Germany

[73] Assignees: Elisabeth Hochstrasser nee Wack; Jürgen Hochstrasser, both of Fed. Rep. of Germany

[21] Appl. No.: 614,264

[22] Filed: May 25, 1984

[30] Foreign Application Priority Data

Jun. 27, 1983 [DE] Fed. Rep. of Germany ....... 3323475
Apr. 2, 1984 [DE] Fed. Rep. of Germany ....... 3412659

[51] Int. Cl.$^4$ ............................................. B25D 15/00
[52] U.S. Cl. ......................................... 173/93; 173/94; 173/139; 173/163
[58] Field of Search ................... 173/94, 100, 97, 165, 173/113, 139, 163, 91, 131, 49, 141, 93, 93.5, 93.6; 74/61; 181/284

[56] References Cited

U.S. PATENT DOCUMENTS 2,966,138 12/1960 Quackenbush ..................... 173/163
3,542,140 11/1970 Hochstrasser et al. ............. 173/193
3,727,702 4/1973 Snider ................................ 173/163
3,880,245 4/1975 Anderson, Jr. ..................... 173/163
4,441,644 4/1984 Farian ................................ 173/139
4,465,145 8/1984 Kuhn ................................. 173/139

FOREIGN PATENT DOCUMENTS 1545076 9/1968 France ............................... 173/163

Primary Examiner—Donald R. Schran
Assistant Examiner—James L. Wolfe
Attorney, Agent, or Firm—Basile, Weintraub & Hanlon

[57] ABSTRACT

The invention relates to a turning mechanism for driving in or extracting piles by means of tangential rotary blows being imparted by a rocker arm equipped with balance weights and arranged in a rotary manner relative to the pile. In order to render superfluous the hitherto necessary noise-damping, additional damping means, damping members made from an incompressible, elastic material are used, which are placed in recesses in at least one stop of a pair of stops in such a way that there is a deformation, particularly at right angles to the impact direction, which is within the elastic limit of the member and prevents direct contact between the stop pairs. These members are arranged on all parts of the rocker arm which, in operation, form noise sources. As a result of this arrangement and construction of the incompressible, elastic members, the working noise of the turning mechanism is reduced to such an extent that it falls within the limits for residential areas, without requiring the hitherto necessary, additional damping means.

10 Claims, 7 Drawing Figures

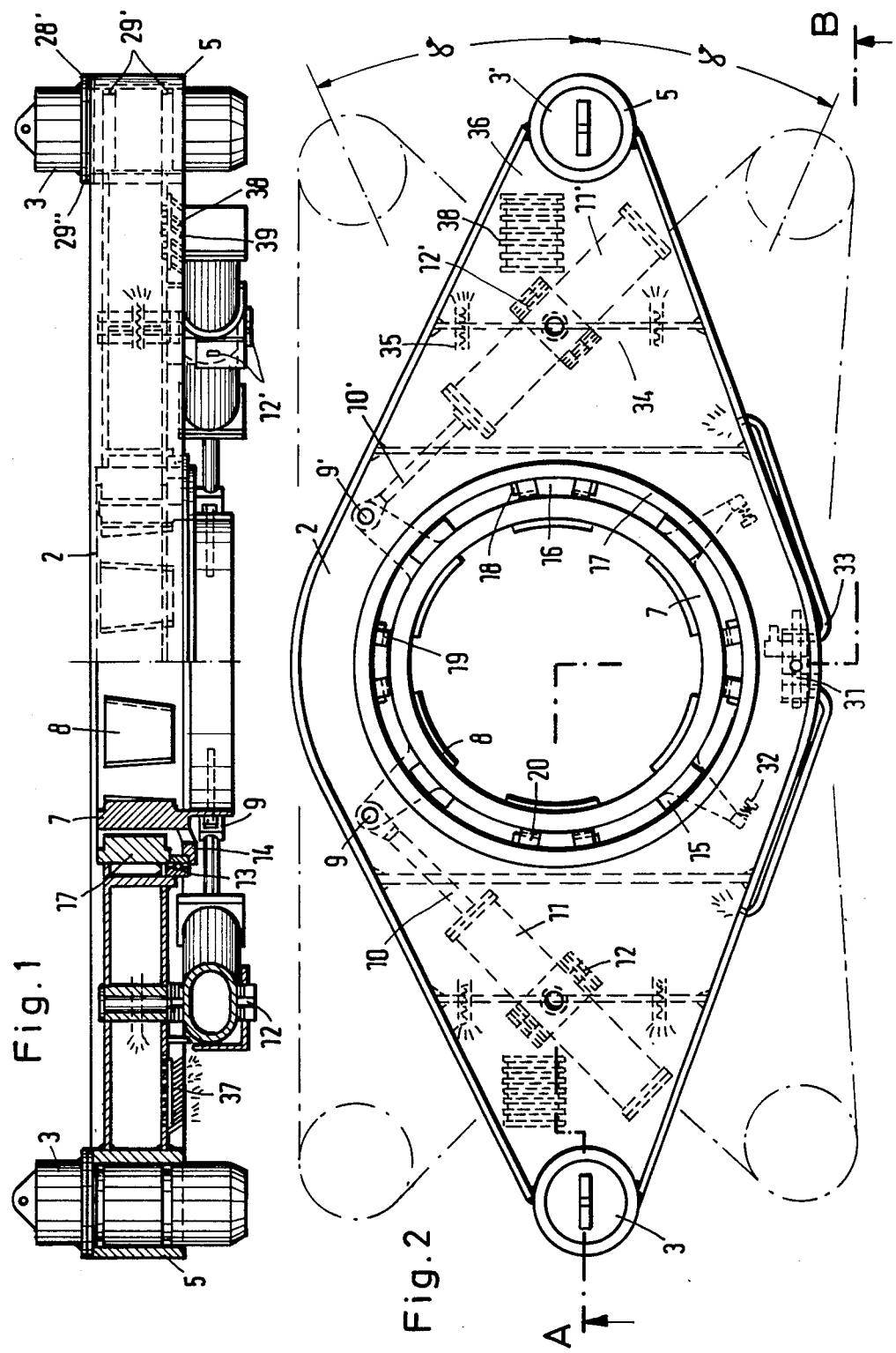

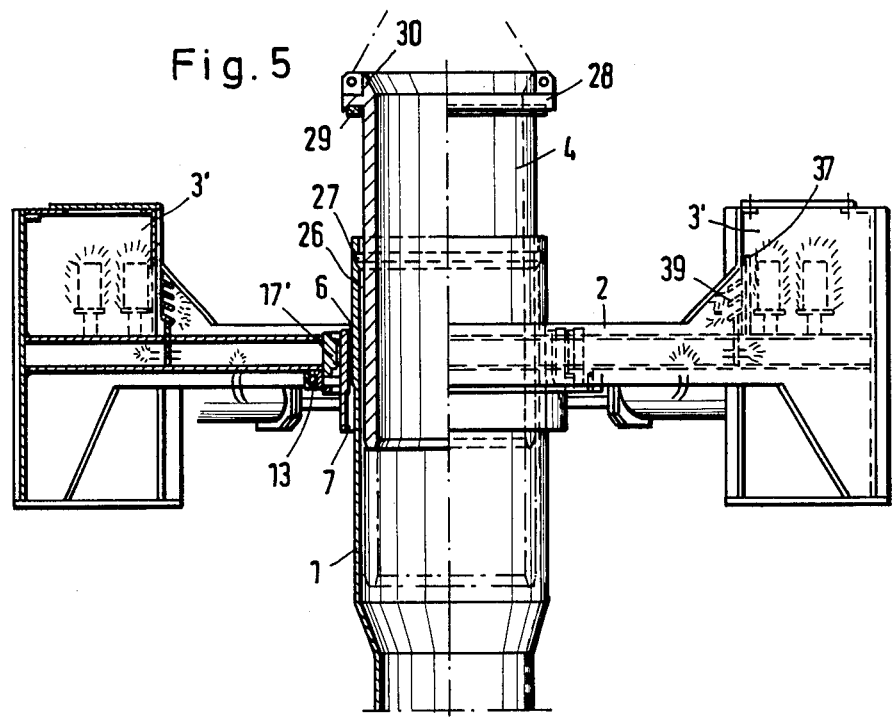
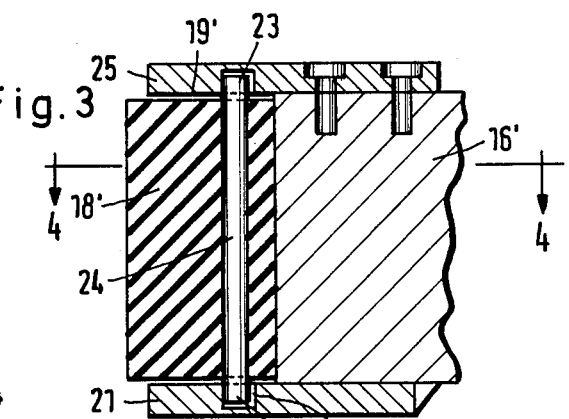
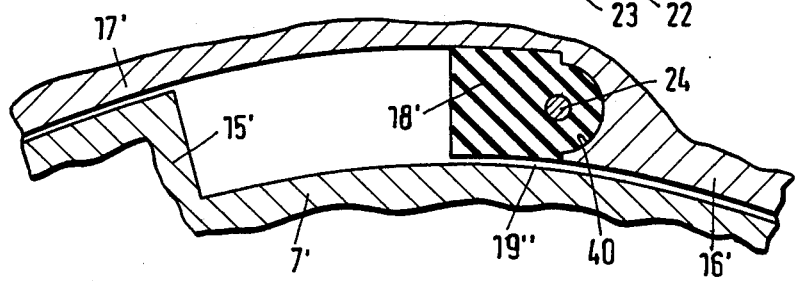

TURNING MECHANISM OPERATING ALTERNATELY IN OPPOSITE DIRECTIONS TO FACILITATE THE DRIVING IN OR EXTRACTING OF PILES

BACKGROUND OF THE INVENTION

I. Field of the Invention

The invention relates to a turning mechanism operating alternately in opposite directions to facilitate the driving in or extraction of piles and the like.

II. Description of the Prior Art

An example of a prior art turning mechanism is disclosed in German Patent 1,709,316. In the turning mechanism disclosed therein the transfer of impact energy takes place by the interchangeably arranged bolt, which is detachably fixed in a corresponding groove-like recess of one stop member and enters the corresponding recess of the other stop member, while transferring the impact energy, without the two facing faces of the pair of stop members coming into direct contact. The bolts on such mechanisms are subject to high wear and as the bolts are easily replaceable, wear to the pair of stops can be avoided so that, even during a very long period of operation, a uniform transference of the impact energy from the rocker arm to the pile is ensured.

A disadvantage of such known turning mechanisms is that they lead to a large amount of working noise, which mainly varies as a function of the soil characteristics. The main source of noise is obviously caused by the stop members which engage with one another during each partial rotation and which serve to transfer the impact energy of the rocker arm to the pile. However, the interchangeable balance weights received in the rocker arm ends also form a considerable noise source, said noise being heard during each impact between the balance weights on the one hand and the rocker arm mounting supports receiving the same on the other hand. During pneumatic operation of the working cylinders, a further noise source results from the release of the compressed air from the cylinders with each impact. A further noise source occurs from using an additional tubular ram member arranged in the upper end of the pile which imparts additional axial balance momentum to the pile in the case of particularly difficult soil conditions. The working noise level resulting from these noise sources is well above the noise level permitted in dwelling areas as a result of existing noise regulations, so that it is necessary, when using the turning mechanism in such inhabited areas, to use costly and difficultly operable sound insulation means, such as e.g. sound absorption boxes, drill tube caps, sound insulating collars or the like, so that the working noise of the turning mechanism remains within the prescribed limits.

The additional sound insulation means necessary when using the turning mechanism in inhabited areas constitutes a considerable disadvantage as a result of the costs thereof, particularly in view of the fact that under different operating conditions, i.e. different soil conditions, different temperature conditions and other differing environmental conditions, it is necessary to use differently constructed sound insulation means, which may have to be changed.

SUMMARY OF THE INVENTION

The purpose of the invention is to avoid the use of additional sound insulation means and to so construct the turning mechanism, on the basis of the arrangement and construction of its noise-generating components, so that the working noise occurring in operation falls within the limits of noise prevention regulations, eliminating the need for the hitherto necessary installation of additional noise insulating and absorbing means.

The member arranged between the pair of stops and used for transferring energy is made from an elastic material, having a low degree of compressibility at high-impact loads and is received in a recess of at least one stop of the pair of stops to permit a deformation within the elastic limit of the member, particularly at right angles to the impact direction. This prevents direct contact of the stop pairs. When the member comes into contact with a stop there is a marked sound insulation, because the noise is considerably reduced by the deformation of the member. In addition, the energy stored in the member through the elastic deformation immediately acts in the opposite direction of movement of the rocker arm, so that the matter is immediately accelerated in that opposite direction. This permits a higher impact frequency to be obtained. Fundamentally, any elastic material with a low degree of incompressibility under high impact loads can be used for the member, provided that the elastic limit thereof is adapted to the particular operating conditions. This enables members with a higher or lower elasticity to be used in the stop pair as a function of the place of installation and the degree of stressing.

When fitting interchangeable balance weights, biased members are provided between the balance weights and the arms of the rocker which reliably prevent the emission of working noise. In the case of pneumatically operable drive cylinders, the compressed air passing out of the latter is led away by means of sound insulating chambers forming part of the rocker arm, so that adequate noise damping is obtained. In the case of an annular ram member arranged in the pile end in order to obtain additional axial impacts on the pile, between the ram member and the pile is provided an annular sound insulating member, which can be deformed within its elastic limit allowing additional noise damping to be obtained.

The prerequisite for the sound damping obtainable by the measures according to the invention is the fact that the rocker arm and pile are always guided concentrically to one another independently of the ambient conditions and the slope of the pile. Thus, according to the invention, between the bearing rim of the pile and the inner flange of the rocker arm is provided a ball turning connection with axially and radially loadable, concentric bearings rings. The outer bearing ring is fixed to the bottom of the inner flange of the rocker arm and the inner bearing ring of the ball turning connection to an auxiliary ring, which is in turn welded to the bearing rim.

Recesses are provided on either side of each stop of the inner flange of the rocker arm and form circumferential gaps with the members permitting a predeterminable deformation within the elastic limits of the member at right angles to the impact direction. In one embodiment, the stop embraces all the members arranged therein on all its circumferential faces, while forming a gap. In a modified embodiment, the stop has in its front face an arcuate recess which receives the correspondingly constructed foot of the member, and one lateral face of the member parallel to the circumferential face of the inner flange engages said surface, while the opposite lateral face of the member forms a gap with the surface of the bearing rim. The two other facing lateral faces of the member are enclosed by a support plate whose bottom is connected to the inner flange and a cover plate whose top can be screwed to the inner flange accompanied by the formation of a gap. A rod is provided which passes through the foot of the member, which is received in bearing bores of the support plate and the cover plate and serves to interchangeably fix the member to the inner flange. This embodiment permits an easy replacement of a member suitable for given operating conditions by another member suitable for other operating conditions and also makes it possible to subsequently equip a known turning mechanism with the member according to the invention.

Another embodiment which permits easy replacement of the members comprises the provision of support plates and cover plates with bulges, which engage with the lateral faces of the projections and consequently form a mounting support for the members in the desired position, without impairing the deformability of the members.

The balance weights are preferably constructed as cylindrical or slightly conical bodies provided with a support flange, which can be introduced into corresponding sleeves at each end of the rocker arm having annular members arranged in circumferential slots, which are pre-stressed and inserted into the sleeves, so that relative movement between the weights and the sleeves is prevented by deformation within the elastic limits of the annular members.

When using pneumatically operable drive cylinders, a common control slide valve arranged on the rocker arm and operable by end stops fixed to the bearing rim is associated therewith. This control slide valve is provided with lines to receive the compressed air passing alternately out of the working cylinders. The lines issue into expansion chambers of the rocker arm used for sound insulation purposes. Advantageously, two expansion chambers interconnected by an overflow tube form a resonance sound absorber and are associated with each working cylinder. The second chamber has an outlet provided with absorbing or insulating mats having guidance members supplying the escaping air to the members. This ensures that, particularly when working at high temperatures, the heat produced in the members by compression and impact is dissipated. The actual insulating mat is constructed as an easily removable insert plate, which can be inserted in the desired quantity into a cavity formed by the perforated walls.

When using an additional ram member for obtaining axial impacts, a member according to the invention is arranged in an outwardly directed annular flange of the ram member in a corresponding groove and has a sound insulating function.

BRIEF DESCRIPTION OF THE DRAWINGS

The invention is described in greater detail hereinafter relative to a non-limitative embodiment and with reference to the attached drawings, wherein:

FIG. 1 is a side view of a rocker arm of the turning mechanism in partial section along line A-B;

FIG. 2 is a top plan view of the turning mechanism shown in FIG. 1 with the rocker arm in the central position, the partial rotations to either side being shown by means of dot-dash lines;

FIG. 3 is an enlarged sectional view of an embodiment of the fixing of the member;

FIG. 4 is a cross-sectional view of the member taken along line 4—4 of FIG. 3;

FIG. 5 is a side view of a turning mechanism with an additional ram member operable in the axial direction;

DESCRIPTION OF THE PREFERRED EMBODIMENTS

Figure 6:
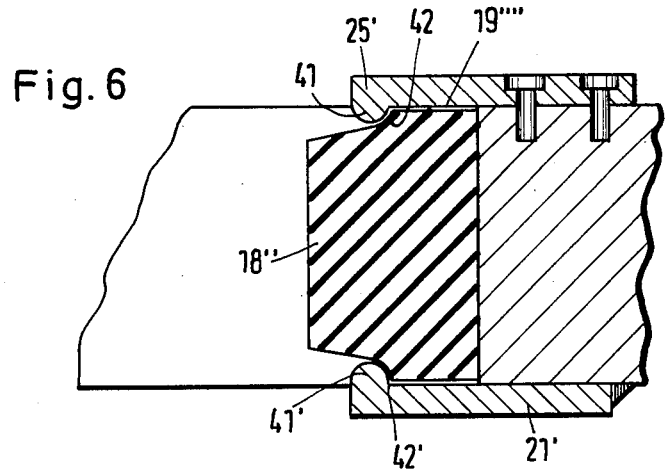
FIG. 6 is an enlarged sectional view of a further embodiment of the fixing of the member taken along line 6—6 of FIG. 7.

As can best be seen in FIGS. 1 and 5, the turning mechanism shown in the drawings comprises four individual parts; namely, pile 1, rotary rocker arm 2, balance weights 3, 3' and annular ram member 4. Rocker arm 2 has two individual arms, which carry sleeves 5 at their ends, in which are inserted the balance weights 3.

To the outer circumference surface of pile 1 are fixed six coupling blocks 6 (FIG. 5), in which can be placed counter-blocks 8 (FIG. 1) arranged on the inner face of the bearing rim 7. The coupling blocks 6 and the counter-blocks 8 hold the bearing rim 7 and consequently rocker arm 2 in an axial direction on pile 1 and serve to transfer the axial momentum produced on operating ram member 4 and also the tangential rotary impacts exerted by rocker arm 2.

Bearing rim 7 has two facing ball and socket joints 9, 9' symmetrical to the secondary axis and on which engage the piston rods 10, 10' of two working cylinders 11, 11', which are fixed to the bottom of the rocker arm 2 so as to rotate in gimbal bearings 12, 12'.

A ball turning connection 13 with a vertical parting line is placed on the bottom of rocker arm 2 concentrically to bearing rim 7. The outer ring of the ball turning connection 13 is connected to the bearing rim 7 and its outer bearing ring is fixed to the bottom of inner flange 17 of rocker arm 2 and its inner bearing ring is fixed to an auxiliary ring 14, which is in turn welded to bearing rim 7 in the manner shown in FIG. 1. Thus, rocker arm 2 is very precisely rotatably mounted on bearing rim 7, even if the piles 1 are not perpendicular.

On its outer circumference, bearing rim 7 has four symmetrical, projecting lug cams 15, 15' (FIGS. 2 and 4), against which alternately engage the incompressible, elastic members 18 fixed to projection 16, 16' of inner flange 17, 17' of turning mechanism 2 on operating the latter. Members 18, 18', 18" can be made from random materials, e.g. plastic or metal, as a function of the particular operating conditions.

As can be seen in FIG. 2, on either side of the projection 16 of inner flange 17 are provided depressions 20, which receive members 18, accompanied by the formation of an air gap 19. As a result of an elastic deformation path predeterminable e.g. by the size of the air gap 19 in the transverse expansion direction of member 18, which is e.g. made from the plastic known under the trade name "Vulkollan", there is a sound-absorbed transfer of the impacts occurring whenever member 18 of rocker arm 2 strikes against the lug cam 15 of bearing rim 7. At the end of each tangential impact, the members 18 firmly engage on their depressions under full force action and, due to the incompressibility of the stops, maximum rotary blows of rocker arm 2 are transferred to pile 1. Due to the resilience of elastic members 18, turning mechanism 2 is immediately accelerated in the opposite direction at the end of the partial rotation of pile 1, so that the drive cylinder 11 immediately start their acceleration with a speed higher than $v_o$, which leads to a higher impact frequency. The relatively low loss energy in the form of heating of members 18 is removed from the drive cylinders 11, 11' into the atmosphere with the aid of external air or expanded compressed air.

For doubling the damping or insulating path relative to the stops of rocker arm 2 on bearing rim 7, it is possible to provide elastomeric members 18 in corresponding depressions 20 on bearing rim 7, or it is possible to provide members 18 only on bearing rim 7 and steel lug cams on inner flange 17 of rocker arm 2.

In the embodiment shown in FIGS. 3 and 4, member 18' is placed in arcuate, groove-like recesses 40 directed perpendicular to rocker arm 2, in order to permit the reconstruction of existing turning mechanisms. A holder 21 is welded to the bottom of stop 16', while a support plate 25 is detachably fixed to the top by means of screws. Plates 21, 25 are provided with bearing bores 22, while member 18' has a through-bore, so that it can be interchangeably connected to stop 16' by means of a rod 24. In order to fix the elastic deformability of member 18', according to FIG. 3 air gaps 19' are provided, while a further gap 19" is placed between 18' and bearing rim 7' so that, when elastically deformed, member 18' engages by one of its lateral faces with the wall of bearing rim 7'.

Figure 7:
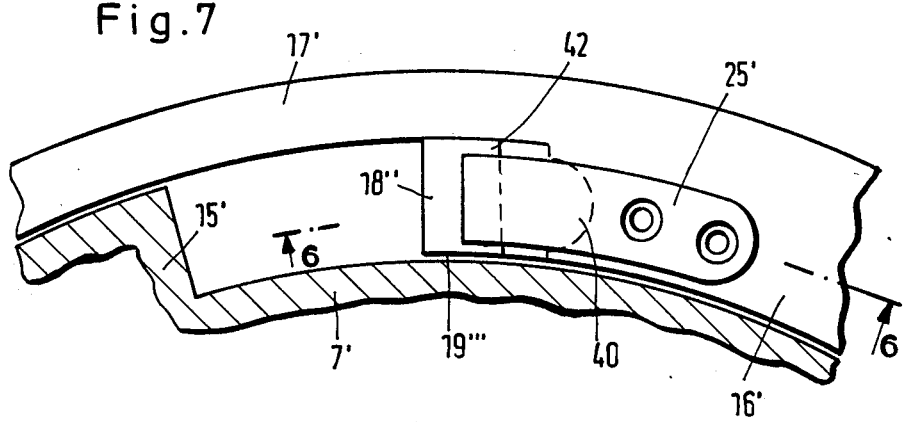
FIG. 7 is a top plan, partially sectioned view of FIG. 6.

FIGS. 6 and 7 shown an embodiment in which the members 18" and their projections 42, 42' are mounted in support plates 21' and cover plates 25' with the aid of bulges 41, 41'.

To enable the same equipment to be used under extremely high mechanical stressing and/or under extreme temperatures, it is merely necessary to replace the standard elastomeric members 18' by identical members, e.g. of copper or rigid plastic.

FIG. 5 shows a further embodiment, in which fixed balance weights 3' are provided. Pile 1 is provided with a reinforced upper part 26 which has an inner groove 27 for receiving a circlip (not shown), which is used for fixing a cover (not shown) for pile 1 during withdrawal with the aid of rocker arm 2 and crane lifting power and optionally also with the aid of compressed air acting inside the pile 1. Within the upper part 26 is provided an annular ram member 4, which is raised and lowered in an axial manner by means of a winch cable in the same way as a free-falling ram. An annular insulating or damping member 29 is provided in a depression on flange 28 and transfers the energy of ram member 4 in impact-damped and sound-insulated manner to the upper part 26 of pile 1 during the simultaneous operation of rocker arm 2.

As can be seen from FIG. 1, the balance weights 3 insertable into sleeves 5 of rocker arm 2 are provided with elastomeric, annular members 29', which are also elastically deformed by an amount predeterminable by a corresponding groove on reaching the end positions of rocker arm 2. Under extreme loading conditions, i.e. in the case of a minimum turning of the pile 1 due to very high earth friction, use is also made of the incompressibility of members 29', 29". Annular, elastomeric members are also arranged between flange 28' of balance weight 3 and the upper front face of sleeve 5. Balance weights 3 are inserted by means of a crane in sleeves 5 and are automatically braced in the sleeves 5 due to the dimensions given to the annular members 29'. Balance weights 3 can differ with regards to their weight and consequently increase the mass moment of inertia of rocker arm 2 and increase the drilling pressure on the cutting edge of pile 1 (not shown), so that rocker arm 2 can be equipped with different balance weights 3.

In the case of a pneumatic operation of rocker arm 2, according to FIGS. 1 and 2 compressed air-operable drive cylinders 11 and control slide valve 31 are provided. The plunger of control slide valve 31 in the end positions of rocker arm 2 strikes against end stops 32 provided with damping elements and is thereby reversed. The compressed air flowing out through the control slide valve 31 is led by means of lines 33 into the sound-absorbing chambers 34 of rocker arm 2. Rocker arm 2 has several expansion chambers 34, 36. The compressed air introduced into chamber 34 expands, flows via overflow tubes 35 acting as a resonance sound absorber into chamber 36, expands again and then flows through an outlet 38 closed with porous insulating mats 37 and which is equipped with deflectors 39 for deflecting the compressed air entering the atmosphere in order to deflect it onto members 18, 18', 18" for cooling purposes. When a very large amount of compressed air is obtained, the interior of chambers 34, 36 can additionally contain insulating mats 37 as an inner lining.

We claim:

1. A turning mechanism operating alternately in opposite directions to facilitate the driving in or extraction of piles or the like, comprising: a bearing rim fixed to said pile; a rocker arm having an inner flange carried by said rim for rotating about the pile axis and having two outwardly extending arms arranged symmetrically to the pile axis; a balance weight carried on each arm; a plurality of stop pairs arranged in series between the bearing rim and the inner flange of the rocker arm, the stop pairs having elements for transferring impact energy from the rocker arm to the bearing rim; at least two drive cylinders, whose casing and piston rods are articulated with respect to the bearing rim and the outwardly extending arms, such that one drive cylinder may be fully extended while another is compressed; a member made from a single elastic material having a low degree of compressibility at high impact loads received in recesses formed in at least one element of each of the stop pairs which permits a deformation within the elastic limit of the member, particularly at right angles to impact direction, and prevents direct contact between the stop pairs; wherein each stop pair comprises a first stop pair member, a projection integrally formed with the inner flange, the projection having a front face with a preferably arcuate recess for receiving the elastic member, and a lateral face in spaced relationship with the bearing rim; the elastic member having a front face capable of engaging a second stop pair member a first lateral face of the elastic member adjacent to the lateral face of the projection, the first lateral face of the elastic member in spaced relationship with the bearing rim to form a first air gap therebetween, a second lateral face of the elastic member in contact with the inner flange, an upper face perpendicularly disposed between the first and second lateral faces, a lower face parallel to the upper face; a bottom support plate fixed to the inner flange; a top cover plate fixed to the inner flange parallel to the bottom support plate the top cover plate and bottom support plate enclosing the elastic member to define a second air gap between the upper face of the elastic member and the top cover plate and a third air gap between the lower face of the elastic member and the lower face of the elastic member.

2. The turning mechanism defined in claim 1 wherein the balance weights are made from solid material and have cylindrical configurations, said balance weights having:
- a support flange extending annularly outward from the balance weight;
- a plurality of circumferential grooves; and
- a plurality of elastomeric annular members, an annular member arranged in each circumferential groove, the elastomeric annular member having a low degree of compressibility at high impact loading and pre-tensioned upon insertion into said sleeves, the elastomeric annular members contacting the interior of the associated sleeve member.

3. The turning mechanism defined in claim 2, further comprising a pneumatically operable drive cylinder wherein the compressed air passing out of the same is removed by means of sound-damping, expansion chambers forming parts of the rocker arm.

4. The turning mechanism defined in claim 1, wherein recesses are arranged on either side of each stop of the inner flange of the rocker arm and from circumferential slots containing the elastic members.

5. The turning mechanism defined in claim 4, wherein the stops embrace said members arranged therein on all its circumferential faces, accompanied by the formation of a gap.

6. The turning mechanism defined in claim 1, further comprising a rod which passes through the foot of the elastic member and is received in bearing bores of said bottom support plate and the top cover plate and which is used for interchangably fixing said member to said inner flange.

7. The turning mechanism defined in claim 1, wherein the bottom support plate and the top cover plate are constructed with bulges, which engage with the lateral faces of said stop members.

8. A turning mechanism operating alternately in opposite directions to facilitate the driving in or extraction of piles or the like, comprising:
- a bearing rim fixed to said pile;
- a rocker arm having an inner flange carried by said rim for rotating about the pile axis, said rocker arm having two outwardly extending arms arranged symmetrically to the axis;
- an annular sleeve located at an outer end of each outwardly extending arm;
- a balance weight carried in each annular sleeve;
- a plurality of stop pairs having members for transferring impact energy arranged between the bearing rim and the inner flange of the rocker arm;
- two opposed drive cylinders, whose casing and piston rods are articulated with respect to the bearing rim and the outwardly extending arms such that one drive cylinder may be fully extended while another is compressed;
- a member made from an elastic material having a low degree of compressibility at high impact loads received in recesses formed in at least one stop element of each of the stop pairs which permits a deformation with an elastic limit of the member, particularly at right angles to an impact direction, and prevents direct contact between the stop pairs;
- a plurality of pneumatically operable drive cylinder;
- a common control slide valve associated with the drive cylinders, which regulates the inflow and outflow of a compressed fluid, which is operable by end stops fixed to the bearing rim, and which is arranged on the rocker arm;
- a first expansion chamber associated with each drive cylinder for removing compressed air from the drive cylinders;
- a conduit connecting each first expansion chamber with the common control slide valve for conveying the compressed fluid from the common control slide valve to the first expansion chamber;
- a second expansion chamber associated with each first expansion chamber for removing compressed air from the first expansion chambers;
- an overflow tube connecting the second expansion chamber with the associated first expansion chamber;
- an outlet associated with each second expansion chamber;
- insulating mats located at each outlet; and
- means for guiding the outflowing air over the members for transferring impact energy.

9. The turning mechanism defined in claim 8, further comprising an insulating mat constructed as an easily removable insert plate, wherein a desired number of the mats can be inserted into a cavity formed by facing perforated walls.

10. The turning mechanism defined in claim 3, wherein the member is received in a groove on the bottom of the annular flange located at the upper end of the ram member.

* * * * *

UNITED STATES PATENT OFFICE
CERTIFICATE OF CORRECTION

Patent No. 4,624,324      Dated November 25, 1986

Inventor(s) Hans Mathieu and Jurgen Hochstrasser

It is certified that error appears in the above-identified patent and that said Letters Patent are hereby corrected as shown below:

Column 5, line 3, after "loss" insert --of--.

Column 5, line 28, delete "shown" and insert --show--.

Column 5, line 67, delete "regards" and insert --regard--.

In the Claims:

Column 6, line 68, delete "lower face of the elastic member" and insert --bottom support plate--.

Signed and Sealed this

Fifteenth Day of September, 1987

Attest:

DONALD J. QUIGG

Attesting Officer     Commissioner of Patents and Trademarks